United States Patent Office 3,444,947
Patented May 20, 1969

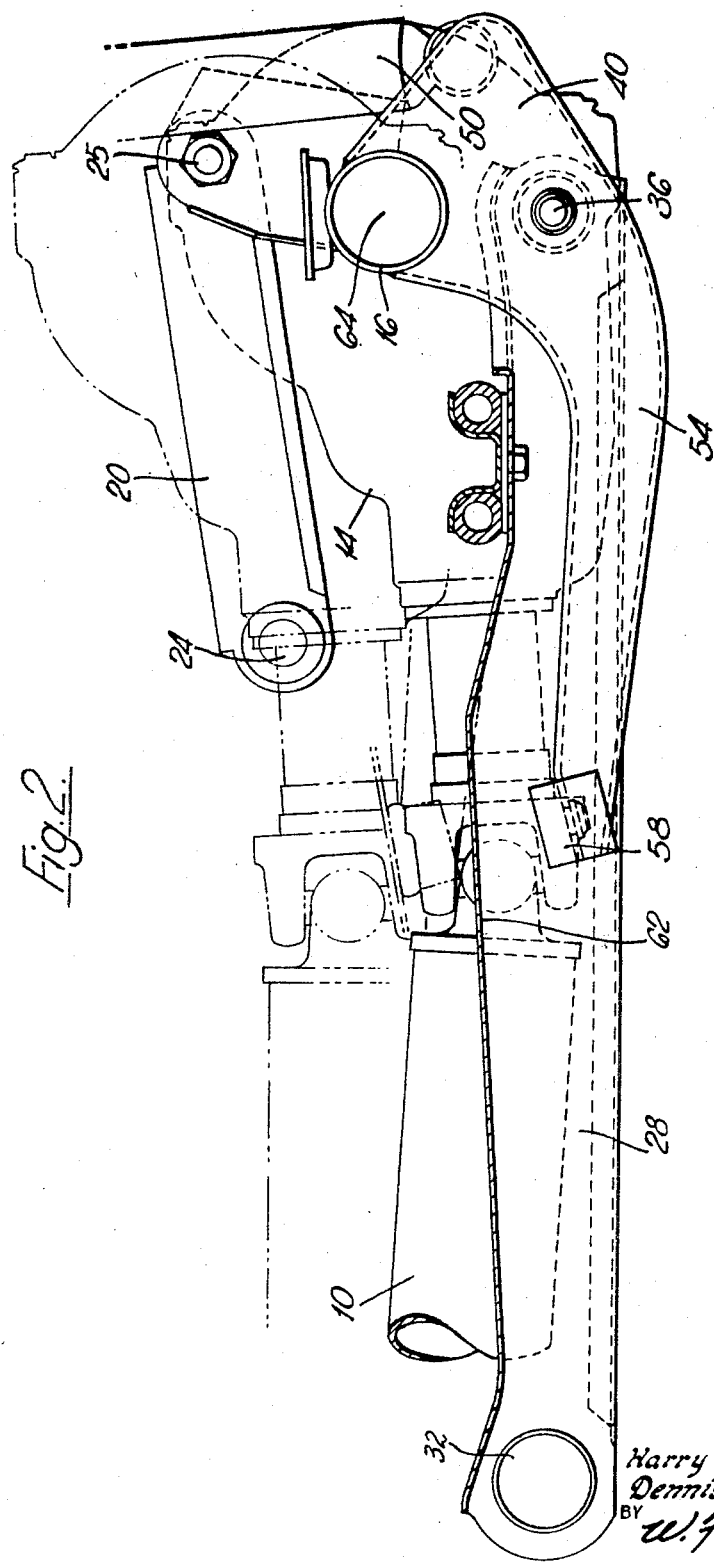

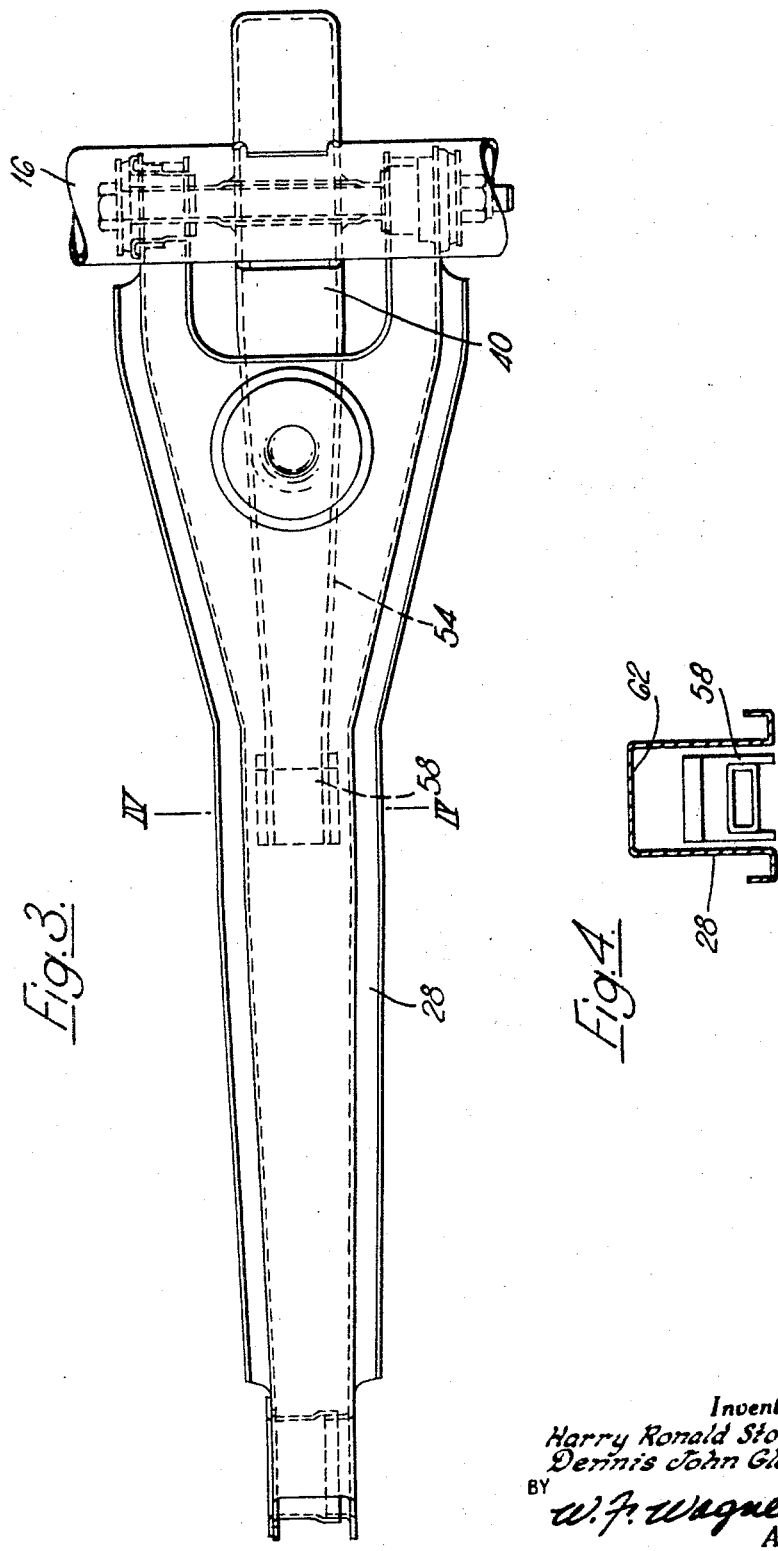

3,444,947
DRIVE AXLE SUSPENSION SYSTEM FOR RESILIENTLY RESISTING ACCELERATION WIND-UP
Harry Ronald Stocks, Dunstable, and Dennis John Gladstone, Luton, England, assignors to General Motors Corporation, Detroit, Mich., a corporation of Delaware
Filed Oct. 5, 1967, Ser. No. 673,177
Claims priority, application Great Britain, Oct. 13, 1966, 45,736/66
Int. Cl. B60g 9/02, 11/16
U.S. Cl. 180—71                                    8 Claims

ABSTRACT OF THE DISCLOSURE

In a motor vehicle suspension system, an arm rigid with a housing for a rigid drive axle carries a resilient snubber, and wind-up of the axle housing induced by acceleration of the vehicle is resiliently resisted by engagement of the snubber with a pivotal guide link for the axle housing.

This invention relates to motor vehicle suspension systems, primarily although not exclusively for rear drive axles.

According to the invention, a suspension system for a motor vehicle comprises a housing for a rigid drive axle, at least one pivotal guide link for the axle housing, and, correspondingly, at least one arm rigid with said housing, with a resilient snubber mounted on each said arm, in an arrangement in which wind-up of the axle housing induced by acceleration of the vehicle is resiliently resisted by engagement of each said snubber with the corresponding pivotal guide link.

In this suspension system, the individual elements may comprise the following, namely: a housing for a rigid drive axle, an upper pair of generally longitudinally extending guide links pivotally connected to a sprung portion of the vehicle and to the axle housing, a lower pair of generally longitudinally extending guide links pivotally connected to the sprung portion of the vehicle and resiliently connected to the axle housing, a transversely extending guide link pivotally connected to the sprung portion of the vehicle and to the axle housing, a pair of compression springs interposed between the sprung portion of the vehicle and the lower pair of guide links, and at least one resilient snubber which is mounted on an arm rigid with the axle housing and, on acceleration of the vehicle, is engageable with one of the lower pair of guide links to resiliently resist wind-up of the axle housing.

The arm on which the resilient snubber is mounted may comprise a forward extension of a bracket which is rigidly secured to the axle housing. The resilient connection between one of the lower pair of guide links and the axle housing may be made by way of the bracket, preferably by resiliently connecting the guide link to the bracket at a position generally below the axle housing.

The bracket can additionally form a lower mounting bracket for a shock absorber having an upper mounting to the sprung portion of the vehicle.

Preferably the suspension system includes a pair of the resilient snubbers, for engagement with respective guide links of the lower pair.

The lower pair of guide links preferably have a downwardly open top-hat section, at least in the region of the resilient snubbers and their mounting arms. This construction allows the resilient snubbers and the major portion of their mounting arms to be accommodated within the inverted top-hat-section portion of the lower guide links, such that acceleration wind-up is resisted by resilient engagement of each snubber with the under surface of the crown portion of the top-hat section.

Downward movement of each resilient snubber and its mounting arm on braking of the vehicle may be resiliently resisted by engagement of the snubber with a bracket fixed to the respective lower guide link.

The resilient snubber(s) may for example be made of rubber.

In the accompanying drawings:

FIG. 2 is an enlarged elevation showing the main parts of the suspension system of FIG. 1;

FIG. 3 is a plan showing a pivotal link and associated parts which are shown in FIG. 2;

FIG. 4 is a local cross-section on the line IV—IV of FIG. 3; and

Figure 1:
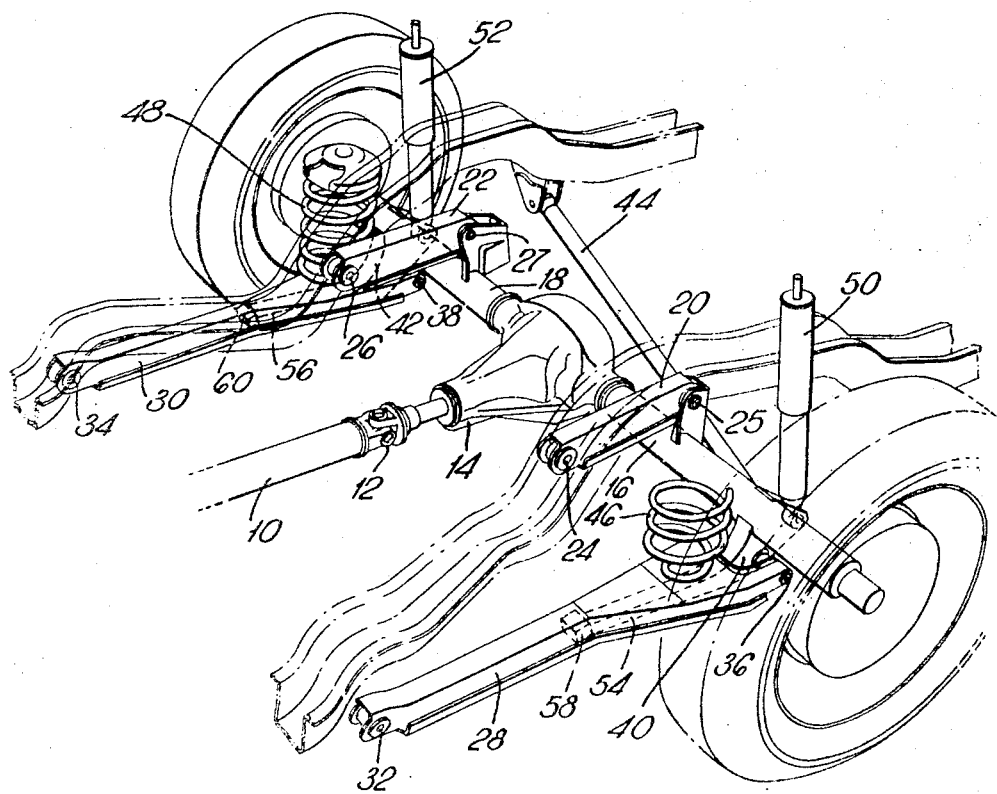
FIG. 1 is a schematic perspective illustrating one embodiment of a motor vehicle suspension system according to the invention.

As is illustrated in a schematic manner in FIG. 1, this embodiment of a motor vehicle suspension system according to the invention is, broadly, a four-link suspension for a rigid rear axle, incorporating a Panhard rod and helical compression springs acting on the lower links.

In detail, the rear end portion 10 of a propeller shaft is pivotally connected by means of a universal joint 12 to an input pinion shaft for a differential gear mechanism (not shown) contained within a differential housing 14. A rear axle housing which is rigid with the differential housing 14 comprises opposed axle tubes 16 and 18 which project from the differential housing and contain drive shafts for the rear wheels of the vehicle.

The four-link suspension includes an upper pair of generally longtiudinally extending pivotal links 20 and 22, which are pivotally connected at their front ends to the vehicle body, which forms the sprung portion of the vehicle, by respective pivots 24 and 26 disposed on a common transverse axis, the rear ends of the links 20 and 22 being pivotally connected by respective pivots 25 and 27 to brackets which are fixedly secured to the respective axle tubes 16 and 18.

The four-link suspension also includes a lower pair of generally longitudinally extending pivotal links 28 and 30 which are pivotally connected at their front ends to the sprung portion of the vehicle by means of respective pivots 32 and 34 disposed on a common transverse axis which is further forward than the common transverse axis for the links 24 and 26. The rear ends of the lower links 28 and 30 are pivotally connected by means of pivots 36 (FIG. 2) and 38 to brackets 40 and 42 which are fixedly secured to the respective axle tubes 16 and 18. The pivots 36 and 38 are disposed at positions generally below the axle tubes 16 and 18 which form parts of the axle housing.

A transversely extending guide link, constituted by a Panhard rod 44, is disposed behind the axle housing. One end of the Panhard rod is pivotally connected to the sprung portion of the vehicle on the right-hand side of the centre line of the vehicle, and the other end is pivotally connected to the left-hand axle tube 16. A pair of helical compression springs 46 and 48, constituting the main suspension springs for the rear axle assembly, are interposed between the sprung portion of the vehicle and the lower links 28 and 30 respectively. Respective shock absorbers 50 and 52 are pivotally connected between the sprung portion of the vehicle and the respective brackets 40 and 42 which are fixedly secured to the axle tubes 16 and 18.

The brackets 40 and 42 include forwardly extending horn-like extensions 54 and 56 forming mounting arms for respective resilient snubbers 58 and 60, which in this embodiment are made of rubber. The snubbers 58 and 60 are arranged to co-operate with the lower links 28 and 30 in a manner which is shown only schematically in FIG. 1, but is shown in detail in FIGS. 2 to 4.

Specifically, as is shown in FIGS. 2 to 4, the bracket 40 consists of a sheet metal structure which is welded to the axle tube 16. The lower link 28, which is generally Y-shaped in plan, is of top-hat section, as clearly shown in FIG. 4, and accommodates both the snubber 58 and the associated mounting arm portion 54 of the bracket 40. When the vehicle is stationary, the snubber 58 is maintained at a distance from the upper web 62 of the lower link 28, namely from the crown portion of the top-hat section. This occurs because the axle tube 16, which is supported by the rear wheels, forms in effect a suspension pivot for the bracket 40, whereas the helical suspension spring 46 transmits a portion of the weight of the sprung portion of the vehicle by way of the lower link 28 to the pivot 36 on the axle bracket 40, so tending to maintain the pivot 36 vertically below the centre axis 64 of the axle tube 16, this being the axis of wheel rotation.

Figure 5:
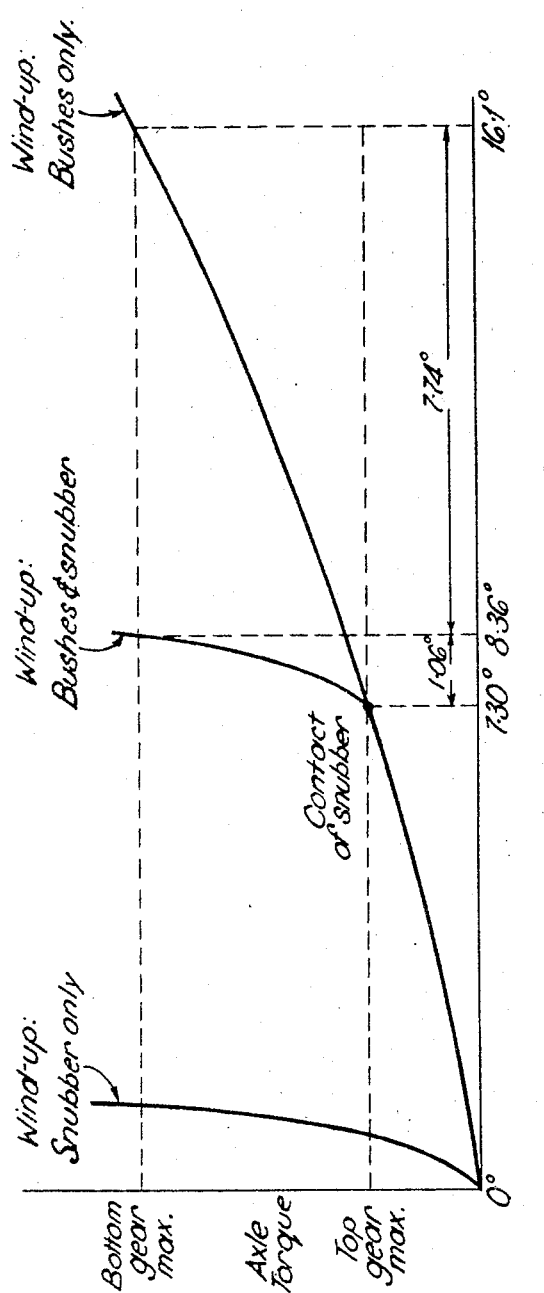
FIG. 5 is a graph in which axle torque is plotted vertically against pinion shaft angle plotted horizontally to illustrate the effect of a pair of resilient snubbers forming part of the suspension system shown in FIGS. 1 to 4.

During acceleration of the vehicle, the axle tube 16 tends to move clockwise as seen in FIG. 2. This clockwise movement is resisted to some extent by resilient annular rubber bushes which are arranged at the pivots for the upper and lower links 20 and 28, namely at the pivots 24, 25 and 32, 36 shown in FIG. 2, and at the corresponding pivots at the right-hand side of the vehicle. The graph shown in FIG. 5, however, illustrates that if these annular bushes were the sole means of preventing acceleration wind-up, the maximum wind-up obtained in bottom gear would involve a change in pinion shaft angle of 16.1°. This would involve an unacceptably large upward movement of the propeller shaft and differential housing, such as would require an exaggerated transmission hump in the vehicle.

The action of the rubber bushes in resisting acceleration wind-up is, therefore, in conformity with the invention, complemented by engagement of the snubber 58 with the upper web 62 of the lower link 28, as shown by the interrupted lines in FIG. 2, which indicate the positions of the parts for maximum axle torque in bottom gear in the full bump condition of the rear axle. As is illustrated in the graph shown in FIG. 5, the conjoint action of the annular bushes and the snubber 58 so limits acceleration wind-up that maximum wind-up in bottom gear involves a change of pinion shaft angle of only 8.36°, in the embodiment shown, as compared with the angle of 16.1° if wind-up were to be prevented by the annular bushes acting alone.

The snubber 60 co-operates with the right-hand lower link 30 in the same manner as the snubber 58 has been described as co-operating with the left-hand lower link 28.

Various changes are of course possible in the embodiment which has been described. For example, a bracket might be attached to the lower link 28, for engagement by the resilient snubber 58 to resiliently resist and limit downward movement of the arm 54 during braking of the vehicle.

What is claimed is:

1. A suspension system for a motor vehicle comprising a rigid drive axle and a housing therefor, an upper generally longitudinally extending guide link pivotally connected at one end to a sprung portion of the vehicle and at the other end to said axle housing, a lower generally longitudinally extending guide link pivotally connected at one end to the sprung portion of the vehicle and at its other end to said axle housing, resilient means interposed between the sprung portion of the vehicle and said lower guide link, an arm rigid with said axle housing underlying and vertically spaced from the underside of said lower guide link, and a resilient snubber mounted on said arm remote from said axle housing and engageable by said underside to resiliently resist wind-up of said axle housing induced by acceleration of said vehicle.

2. A suspension system according to claim 1, wherein the arm on which the resilient snubber is mounted comprises a forward extension of a bracket which is rigidly secured to the axle housing.

3. A suspension system according to claim 2, wherein a resilient connection between said lower guide link and the axle housing is made by way of the bracket, in the form of a resilient connection between the guide link and the bracket at a position generally below the axle housing.

4. A suspension system according to claim 2, wherein the bracket additionally forms a lower mounting bracket for a shock absorber having an upper mounting to the sprung portion of the vehicle.

5. A suspension system according to claim 1, wherein there is a pair of the resilient snubbers mounted on a pair of said arms rigid with said axle housing, for engagement with respective guide links of a lower pair.

6. A suspension system according to claim 5, wherein the lower pair of guide links have a downwardly open top-hat section in the region of the resilient snubbers and their mounting arms, in an arrangement such that acceleration wind-up is resisted by resilient engagement of each snubber with the under surface of the crown portion of the top-hat section.

7. A suspension system according to claim 5, wherein downward movement of each resilient snubber and its mounting arm on braking of the vehicle is resiliently resisted by engagement of the snubber with a bracket fixed to the respective lower guide link.

8. A suspension system according to claim 5, wherein each resilient snubber is made of rubber.

References Cited

UNITED STATES PATENTS 2,218,634   10/1940   Best _____ 280—124 X

A. HARRY LEVY, *Primary Examiner.*

U.S. Cl. X.R.

267—20